(12) United States Patent
Dubrovsky et al.

(10) Patent No.: US 12,705,034 B2
(45) Date of Patent: Aug. 11, 2026

(54) SERVICES DEPLOYMENT TO DATA PROCESSING SYSTEMS

(71) Applicant: Dell Products L.P., Round Rock, TX (US)

(72) Inventors: Igor Dubrovsky, Beer Sheva (IL); Boris Shpilyuck, Ashdod (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 18/495,154

(22) Filed: Oct. 26, 2023

(65) Prior Publication Data

US 2025/0138795 A1 May 1, 2025

(51) Int. Cl.
*G06F 8/41* (2018.01)

(52) U.S. Cl.
CPC .................................... *G06F 8/433* (2013.01)

(58) Field of Classification Search
CPC ....................................................... G06F 8/433
See application file for complete search history.

(56) References Cited

U.S. PATENT DOCUMENTS 8,677,318 B2 * 3/2014 Mohindra ................ G06F 8/61 717/121
10,417,058 B1 * 9/2019 Kesler ..................... G06F 9/448
10,862,779 B2 * 12/2020 Sahoo ................... H04L 43/045
11,522,947 B1 12/2022 Bade
11,599,354 B2 * 3/2023 Bhagwan ................ G06F 8/436
11,757,720 B2 * 9/2023 Gershaft ................. H04L 41/22 709/223
11,842,221 B2 * 12/2023 Glass .................. H04L 41/0806
11,947,939 B1 * 4/2024 Longmore .............. G06F 8/433
12,020,025 B1 * 6/2024 Zhang ..................... G06F 8/433
12,073,263 B1 * 8/2024 Thompson ................ G06F 9/54
12,353,856 B2 * 7/2025 Dahl ......................... G06F 8/36
12,511,106 B1 * 12/2025 Fontaine ................. G06F 8/433
12,511,370 B2 * 12/2025 Dubrovsky ............... G06F 8/60
(Continued)

FOREIGN PATENT DOCUMENTS

WO WO-2024049518 A1 * 3/2024 ............... G06F 8/60

OTHER PUBLICATIONS

Hejderup, Joseph, Arie Van Deursen, and Georgios Gousios. “Software ecosystem call graph for dependency management.” Proceedings of the 40th International Conference on Software Engineering: New Ideas and Emerging Results. 2018.*

*Primary Examiner* — Francisco J Aponte
(74) *Attorney, Agent, or Firm* — WOMBLE BOND DICKINSON (US) LLP

(57) ABSTRACT

Methods and systems for managing services provided by a data processing system are disclosed. A service of the services may be managed by accounting for other services and dependencies on which the service of the service relies. To account for the other services, the dependencies may need to be validated. To validate the dependencies, the other services may be checked to see if they are implemented. If the other services are not implemented, the other services may be supplemented. Otherwise, the other services may be validated and therefore the dependencies may be validated. Once the other services and the dependencies are validated, then a service of the services may be deployed.

20 Claims, 6 Drawing Sheets

(56) References Cited

U.S. PATENT DOCUMENTS

| | | | | |
|---|---|---|---|---|
| 12,524,522 | B2 * | 1/2026 | Pallapolu | G06F 21/53 |
| 12,585,470 | B1 * | 3/2026 | Fontaine | G06F 9/3838 |
| 2018/0329697 | A1 * | 11/2018 | Klemenz | G06F 9/524 |
| 2020/0409671 | A1 * | 12/2020 | Mazurskiy | G06F 8/36 |
| 2021/0224076 | A1 * | 7/2021 | Dockter | G06F 9/4881 |
| 2022/0197622 | A1 * | 6/2022 | Steavenson | G06F 9/45558 |
| 2022/0374257 | A1 | 11/2022 | Fan | |
| 2023/0126113 | A1 * | 4/2023 | Balasubramanian | G06N 5/022 717/127 |
| 2023/0205502 | A1 * | 6/2023 | Luthra | G06F 8/60 717/177 |
| 2023/0224175 | A1 | 7/2023 | Tsiatsikas | |
| 2023/0251872 | A1 * | 8/2023 | Dockter | G06F 8/427 713/2 |
| 2024/0168734 | A1 * | 5/2024 | Bailey | G06F 11/3466 |
| 2024/0214229 | A1 | 6/2024 | Han | |
| 2024/0406278 | A1 | 12/2024 | Patro | |

* cited by examiner

SERVICES DEPLOYMENT TO DATA PROCESSING SYSTEMS

FIELD

Embodiments disclosed herein relate generally to service management. More particularly, embodiments disclosed herein relate to managing deployment of services to data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
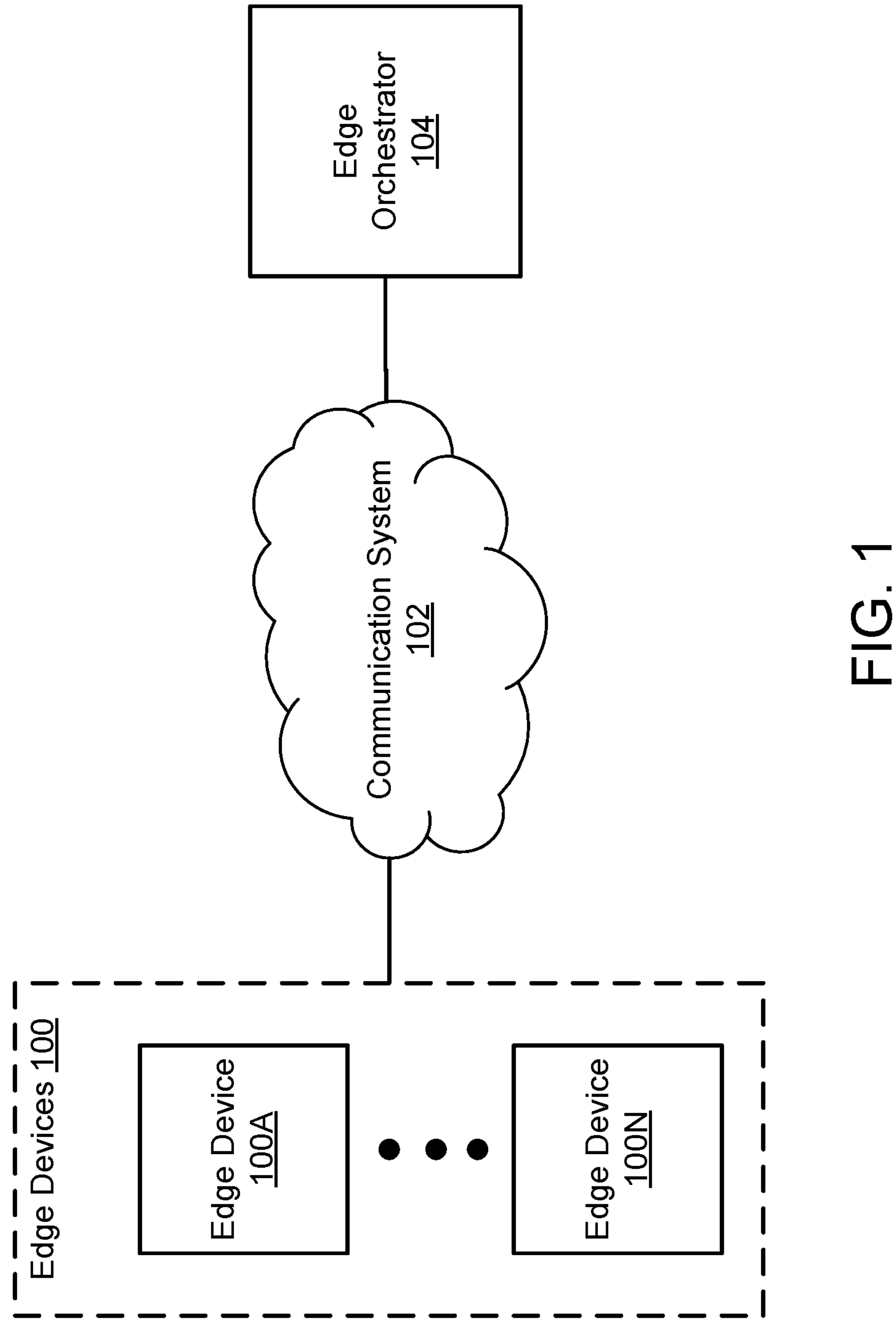
FIG. 1 shows a diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing services provided by a data processing system. The services may be managed accounting for all dependencies of a service of the services. All the dependencies may be accounted by generating a dependency graph for the service of the services and validating the dependencies.

The dependency graph for the service of the services may illustrate other services and relate to the service as dependencies. Before implementing the service of the services, the other services may be implemented. To ensure that the other services may be properly implemented, the other services may need to be validated.

To validate the other services, dependencies may be validated. For the dependencies that cannot be validated, supplemental services may be implemented, and the dependency graph may be updated. For the dependencies that are implemented successfully, the dependencies may be validated. Once the dependencies, and thus the other services are validated, the service may be deployed.

In an embodiment, a method for managing services provided by a data processing system is provided. The method may include (i) obtaining a request for deployment of a service of the services; (ii) obtaining, for the service, a dependency graph, the dependency graph indicating dependencies of the service on other services; (iii) performing, using the dependency graph, a dependency analysis of the data processing system with respect to the other services to identify a compatibility state of the data processing system with respect to the service; (iv) in a first instance of the performing where the compatibility state of the data processing system is compatible with respect to the service: (a) instantiating a new instance of the service on the data processing system; and (b) providing computer implemented services using, at least in part, the new instance of the service; (v) in a second instance of the performing where the compatibility state of the data processing system is incompatible with respect to the service: (a) performing, using at least the dependency graph, an updating process for the data processing system to change the compatibility state to be compatible with respect to the service; (b) instantiating the new instance of the service on the data processing system; and (c) providing the computer implemented services using, at least in part, the new instance of the service.

Performing the dependency analysis may include (i) identifying the other services on the dependency graph; and (ii) attempting to verify that first instances of the other services are hosted by the data processing system.

For one instance of the other services that is verified as being hosted by the data processing system, attempting to verify that the instances of the other services are hosted by the data processing system may include: (i) identifying dependencies of the one instance of the other services to identify at least one additional service; and (ii) attempting to verify that second instances of the at least one additional service are hosted by the data processing system.

For a missing service of the other services, performing the updating process may include: (i) instantiating a new instance of the missing service; and (ii) validating operation of the new instance to obtain a validated service.

For the missing service of the other services, performing the updating process may further include: (i) performing a dependency analysis for the validated service to identify a second missing service; and (ii) instantiating a second new instance of the second missing service.

The dependency graph comprises nodes that represent the other services and edges that represent the dependencies of the other services.

The dependency of the dependencies represents a relationship between a first service of the other services and a second service of the other services, and the relationship indicates that an instance of the second service must be available for use by the first service for the first service to operate nominally.

The dependency graph is based on source code corresponding to the service.

The source code comprises application programming interface calls, and nodes and edges of the dependency graph are based, at least in part, on the application programming interface calls.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, various instances of software may be deployed to host systems. When executed, the instances of the software may provide all, or a part of the computer implemented services.

For example, the instances of the software may include container images. The container images may include information usable to instantiate containerized environments in which instances of applications may be hosted. Each containerized environment may have access to some computing resources of a host system thereby allowing the applications in the containerized environments to operate independently.

However, for the instances of the services to contribute to the desired computer implemented services, the instances of the containerized environments may need to operate in a nominal manner. To operate nominally, various prerequisites may need to be in place for nominal operation of the services. For example, to operate nominally various other services may need to be already in place and available for use by the new services. Thus, a service may be dependent on one or more other services. Accordingly, for the service to operate nominally, the one or more other services may need to be implemented first. However, if the services are not operating nominally, then the requested computer implemented services may not be provided or may be provided in an undesired manner. For example, the services may encounter errors in their operation and/or may exhibit other undesired activity.

In general, embodiments disclosed here relate to systems and methods for managing services provided by a data processing system. To provide the services, various services may be instantiated in a manner that improves the likelihood of the services operating nominally. For example, dependencies of the services may be validated as being in place prior to allowing the services to be instantiated. The dependencies may be validated by verifying services to which the dependencies are related are in place and in a good and operable condition.

Verifying the services may require organizing how the dependencies are related between services. For example, if a service requires that the one or more other services to be implemented to operate nominally, then one or more dependencies may exist between the service and the one or more other services. Further, the one or more other services may each include dependencies on a second set of one or more other services. The dependencies between the service, the one or more other services, and the second set of one or more other services may be documented using a dependency graph.

A dependency graph may define dependencies between the service and other services. The defined dependencies between the service and the other services may allow the services that need to be implemented before implementing the service to be identified. If these required services are in place, then the operation of these services may be verified to ascertain that they are in a good working order.

To verify proper operation of the services, similar dependency graphs for these services may also be used to identify the services upon which these required services depend. This process of verification may be repeated until all dependencies of a new service are verified as being in place an in a functional manner.

By doing so, embodiments disclosed herein may improve the likelihood that deployed services operated in a desired manner.

To provide the above noted functionality, the system may include edge devices 100, and edge orchestrator 104. Each of these components is discussed below.

Edge devices 100 may include any number of edge device 100A-100N. Edge device 100A-100N may provide computer implemented services. To do so, various services may be deployed to the edge devices.

Additionally, edge devices may cooperate with edge orchestrator to facilitate identification and verification of dependencies. For example, edge devices 100 may provide information to edge orchestrator regarding the instances of services hosted by each of edge devices 100. In this manner, edge orchestrator may verify that dependencies for new services are in place prior to deployment of the new services.

Edge orchestrator 104 may manage provisioning of computer implemented services by edge devices 100. To do so, edge orchestrator 104 may (i) obtain requests for services to be deployed to edge devices 100, (ii) identify dependencies of the new services, (iii) attempt to verify the dependencies, (iv) if the dependencies cannot be verified, recursively instantiate new services and verify dependencies of the new services until all of the dependencies for the new service are verified, (v) once the dependencies are verified, instantiate the instances of the new services.

When attempting to verify the dependencies, orchestrator 104 may obtain information from edge devices 100 regarding hosted instances of services. The information may be compared to dependency information in a dependency graph for the services.

The dependency graph may be a data structure that documents the dependency of a new service on other services, and/or the dependencies of these other services on still other services, etc. Thus, when a new service is requested to be deployed, the dependencies may be evaluated using the dependency graph.

Once the new services are deployed, the new services may provide desired computer implemented services.

While providing their functionality, any of edge devices 100 and edge orchestrator may perform all, or a portion, of the flows and methods shown in FIGS. 2A-3B.

Any of (and/or components thereof) edge devices 100 and edge orchestrator 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

Figure 2A:
FIGS. 2A-2B show data flow diagrams illustrating operation of a system in accordance with an embodiment.
Figure 2A:
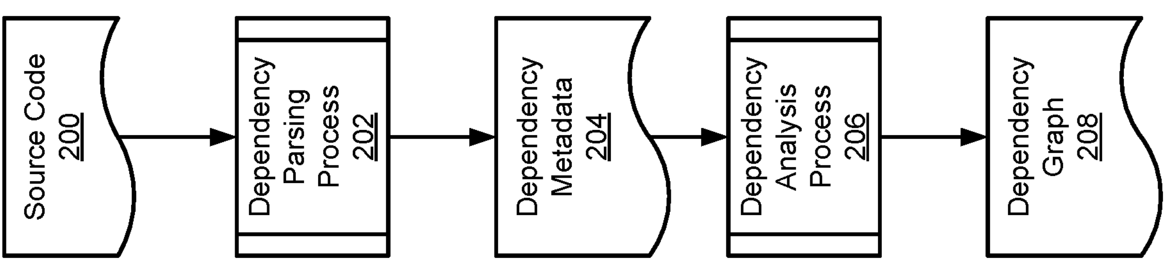
Figure 2B:
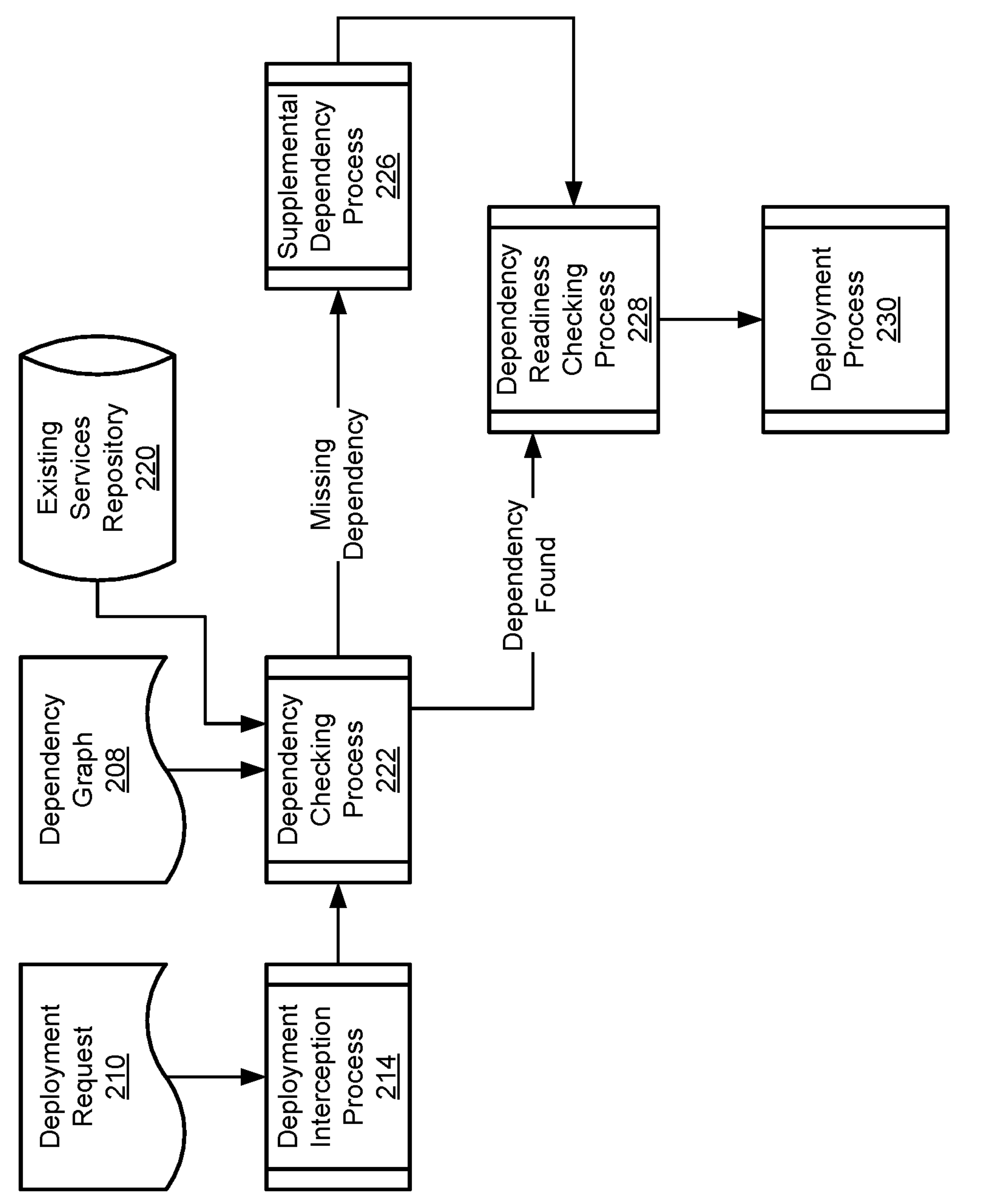

To further clarify embodiments disclosed herein, data flow diagrams in accordance with an embodiment are shown in FIGS. 2A-2B. In these diagrams, flows of data and processing of data are illustrated using different sets of shapes. A first set of shapes (e.g., 200, 204, etc.) is used to represent data structures, a second set of shapes (e.g., 202, 206, etc.) is used to represent processes performed using and/or that generate data, and a third set of shapes (e.g., 220, 224, etc.) is used to represent large scale data structures such as databases.

Turning to FIG. 2A, a first data flow diagram in accordance with an embodiment is shown. The first data flow diagram may illustrate data used in and data processing performed in generation of a dependency graph and/or a deployment request.

To obtain the dependency graph, source code 200 may be obtained. Source code 200 may include interpreted and/or precompiled programming.

Source code 200 may include services and dependencies. Dependencies may relate services by API calls to source code 200.

Once obtained, source code 200 may be ingested by dependency parsing process 202. During dependency parsing process 202, the services that will be used by other services based on source code 200 may be identified. For example, source code 200 may be syntactically analyzed to identify application programming interface calls that invoke the services. These services may be treated as dependencies for the other services (e.g., compiled versions of) based on source code 200.

The list of dependencies may be stored as dependency metadata 204. Once obtained, dependency metadata 204 may be ingested by dependency analysis process 206. During dependency analysis process 206, the source code for the dependencies for source code 200 may be analyzed to identify their dependencies. This process may be repeated until all of the dependencies for source code 200 are identified. These dependencies may be used to generate a dependency graph 208.

Dependency graph 208 may include nodes representing services and edges between the nodes representing the dependencies for source code 200. For example, an initial node representing source code 200 may be generated. The dependencies from source code 200 (e.g., identified in dependency analysis process 206) may be added as other nodes with edges from the initial node to these other nodes. Once established, the process may be repeated for the dependencies of the services represented by these other nodes.

Once dependency graph 208 is generated, the system may be in position to validate that dependencies for services based on source code 200 are in place prior to instantiating instances of the services. Consequently, deployment request 210 may be obtained (e.g., by advertising the fact that instances of the services based on source code 200 may now be instantiated). Deployment request 210 may request that a new instance of a service based on source code 200 be instantiated.

Thus, using the interaction diagram shown in FIG. 2A, embodiments disclosed herein may facilitate generation of a dependency graph usable to validate that new instances of a service are more likely to operate as expected.

Turning to FIG. 2B, a second data flow diagram in accordance with an embodiment is shown. The second data flow diagram may illustrate data used in and data processing performed in deploying new instances of processes based on source code.

Returning to the discussion from FIG. 2A, deployment request 210 from FIG. 2A, may be ingested by deployment interception process 214. During deployment interception process 214, validation of the dependencies for new instances of services based on source code 200 may be initiated. To initiate validation, the dependency graph 208 may be analyzed.

For to analyze dependency graph 208, dependency checking process 222 may be initiated. During dependency checking process, the dependencies specified by dependency graph 208 may be checked against existing services hosted by a system to which the new services is to be deployed.

To check the dependencies, information regarding the existing services may be retrieved from existing services repository 220. Existing services repository 220 may be a data structure that includes information regarding existing services hosted by the target deployment location for the new service that are in good operating condition. Existing services repository 220 may be updated over time to ensure that it include information regarding the target deployment location that is accurate.

To check the dependencies, the dependencies for the new service as specified by dependency graph may be checked against existing services repository 220.

For a missing dependency, supplemental dependency process 226 may be performed. During supplemental dependency process 226, new instance of the missing service may be instantiated. Once instantiated, information regarding the new service may be added to existing services repository 220 to update it. Similarly, information regarding the now-ready dependency may be provided to dependency readiness checking process 228, discussed below.

For dependencies that are found in existing services repository 220, information regarding these found dependencies may be provided to dependency readiness checking process. In this manner, missing dependencies for the new service may be instantiated so that the target deployment location is able to support execution of the new service instances.

Once all of the dependencies specified by dependency graph 208 are satisfied, dependency readiness checking process 228 may be performed. During dependency readiness checking process 228, the condition of all of the services specified by dependency graph 208 may be validated as being in good an operable condition.

The services may be validated, for example, by (i) initiating small scale use of these services using test workloads or other methods, (ii) reading logs and interpreting the logs regarding operating condition of the services, and/or other processes may be performed. If any of the services are found to not be in good and operable condition (e.g., may be measured using criteria defined by a subject matter expert), then new instances of the services may be instantiated so that the dependencies specified by dependency graph 208 are satisfied.

Once dependency readiness checking process 228 is complete, deployment process 230 may be performed. During deployment process 230, a new instance of a service based on source code 200 may be deployed to a target location (e.g., as specified by deployment request 210).

However, if the dependencies of dependency graph 208 are unable to be satisfied (e.g., validated as being present and in an expected operating condition), then a new instance of the service as requested by deployment request 210 may not be instantiated.

Thus, using the flows shown in FIG. 2B, embodiments disclosed herein may facilitate deployment of new instances of services in a manner that improves the likelihood of the services operating in a nominal manner.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Figure 3A:
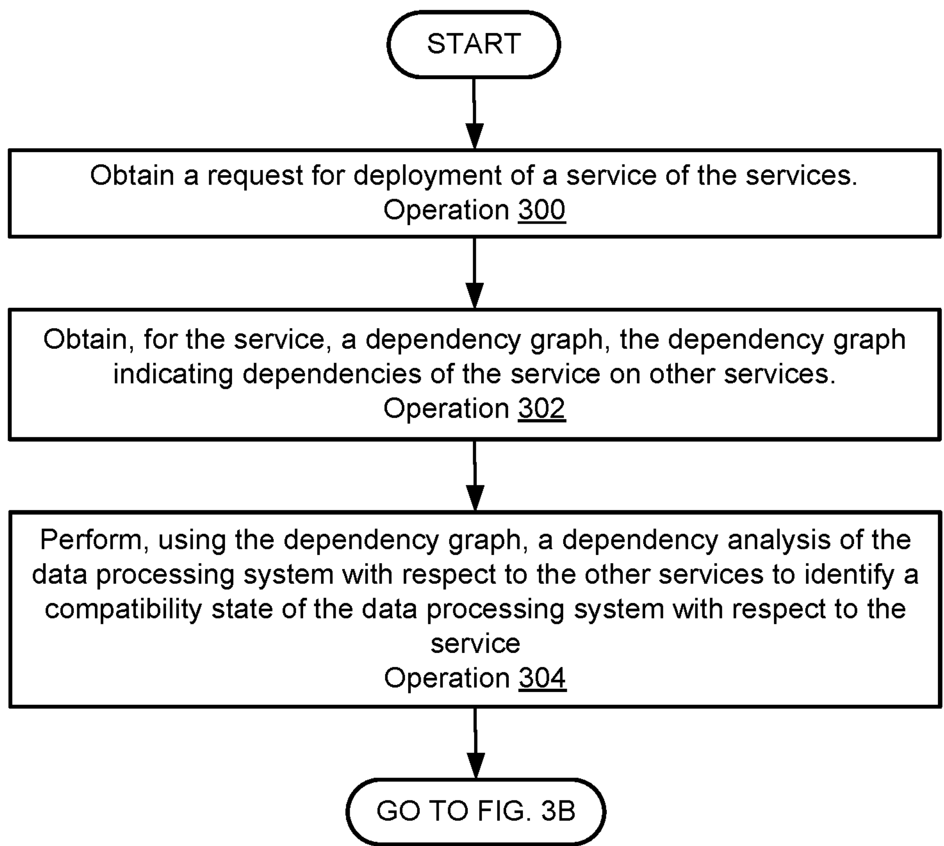
FIGS. 3A-3B show flow diagrams illustrating methods in accordance with an embodiment.
Figure 3B:
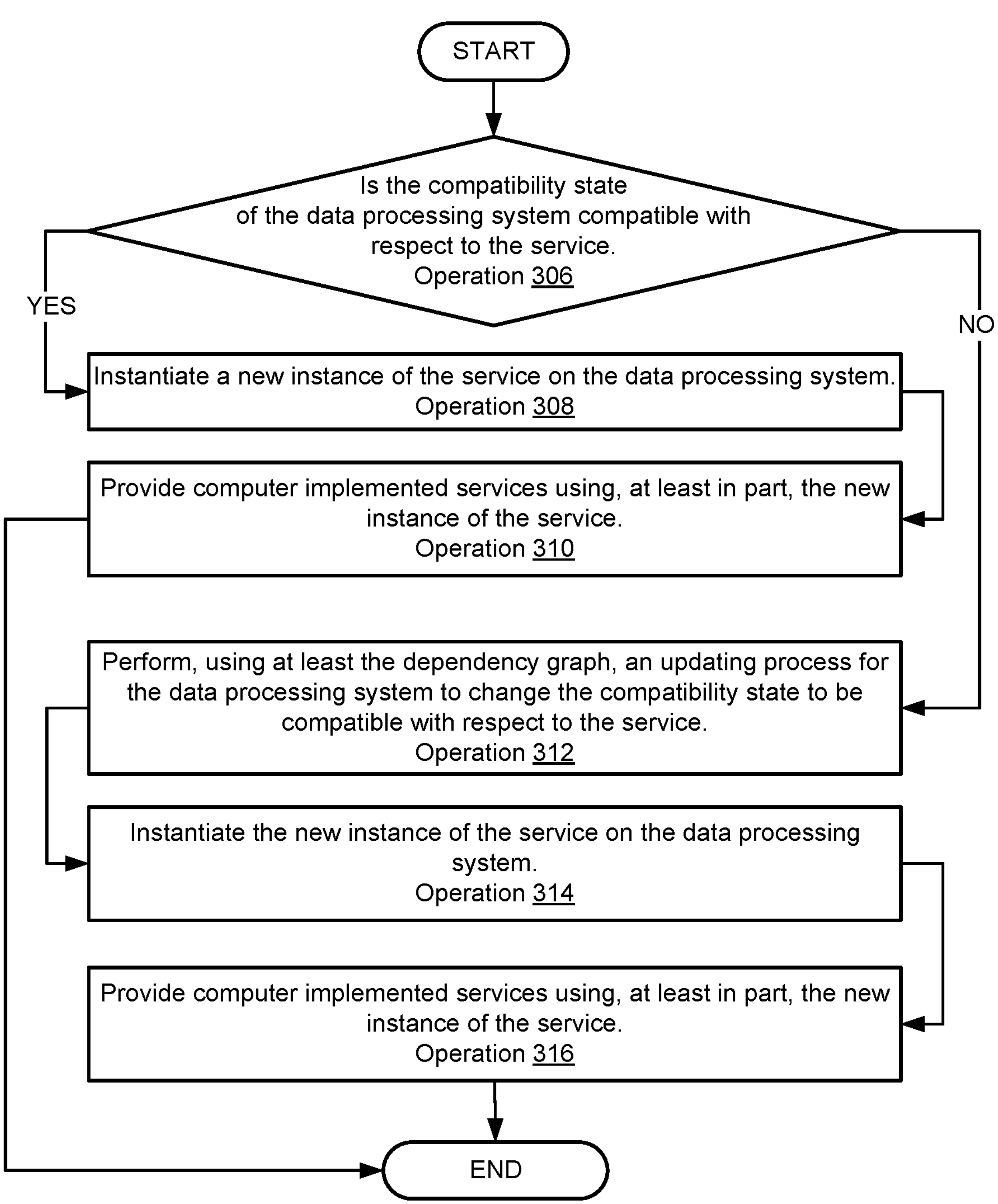

As discussed above, the components of FIG. 1 may perform various methods to manage services provided by a data processing system. FIGS. 3A-3B illustrate methods that may be performed by the components of the system of FIG. 1. In the diagrams discussed below and shown in FIGS. 3A-3B, any of the operations may be repeated, performed in different orders, and/or performed in parallel with or in a partially overlapping in time manner with other operations.

Turning to FIG. 3A, a first flow diagram illustrating a method of managing services provided by a data processing system in accordance with an embodiment is shown. The method may be performed, for example, by any of the components of the system of FIG. 1, and/or other components not shown therein.

At operation 300, a request may be obtained for deployment of a service of the services. The request may be obtained by receiving, by the data processing system, the request for the deployment of the service of the services. The request may be received from a user device or other computing device, and/or may be generated based on user input provided to a computing device.

At operation 302, a dependency graph may be obtained for the service, the dependency graph indicating dependencies of the service on other services. The dependency graph may be obtained by reading the dependency graph from storage. The dependency graph may have been generated by syntactically analyzing source code on which the new instance of the service will be based to identify other services on which the service depends. This process may be repeated for newly identified dependencies of these identified services until all dependencies for the service is generated.

At operation 304, a dependency analysis may be performed, using the dependency graph, with respect to the other services to identify a compatibility state of the data processing system with respect to the service. The dependency analysis may be performed by (i) identifying the other services on the dependency graph; and (ii) attempting to verify that first instances of the other services are hosted by the data processing system. The other services on the dependency graph may be identified by reading edges on the dependency graph that connect to nodes, which signify the other services used in the service.

The first instances of the other services may be attempted to be verified, for one instance of the other services that is verified as being hosted by the data processing system, by (i) identifying dependencies of the one instance of the other services to identify at least one additional service; and (ii) attempting to verify that second instances of the at least one additional service are hosted by the data processing system. The dependencies of the one instance of the other services may be identified by reading the edges on the dependency graph which connect to the nodes, which signify the other services used in the service. The second instances of the at least one additional service may be attempted to be verified by following the dependency graph to search for further dependencies.

Turning to FIG. 3B, FIG. 3B shows a continuation of the flow diagram shown in FIG. 3A.

At operation 306, a determination may need to be made regarding whether the compatibility state of the data processing system is compatible with respect to the service. The determination may be made by confirming that the service may be able to operate with the data processing system.

If the compatibility state of the data processing system is compatible with respect to the service, then the method may proceed to operation 308. Otherwise, if the compatibility state of the data processing system is not compatible with respect to the service, then the method may proceed to operation 312.

At operation 308, a new instance of the service may be instantiated by the data processing system. A new instance may be instantiated by implementing the service using the data processing system.

At operation 310, computer implemented services may be provided using, at least in part, the new instance of the service. Computer implemented services may be provided by using the implementation of the service by the data processing system.

The method may end following operation 310.

Returning to operation 306, at operation 312, an updating process, for the data processing system, may be performed, using at least the dependency graph, to change the compatibility state to be compatible with respect to the service. The updating process may be performed, for a missing service of other services, (i) by instantiating a new instance of the missing service; and (ii) validating operation of the new instance to obtain a validated service. The new instance of the missing service may be instantiated by generating a new instance of the missing service. Operation of the new instance of the missing service may be validated by confirming the functionality of the new instance.

The updating process may be further performed for the missing service of the other services by (i) performing a dependency analysis for the validated service to identify a second missing service; and (ii) instantiating a second new instance of the second missing service. The process may be repeated any number of times to sequentially review dependencies of newly instantiated instances of missing services until all dependencies are satisfied.

At operation 314, a new instance of the service may be instantiated by the data processing system. The new instance may be instantiated by instructing an automation framework or other entity hosted by the data processing system to create the new instance of the service.

At operation 316, computer implemented services may be provided using, at least in part, the new instance of the service. Computer implemented services may be provided by using the new instance of the service hosted by the data processing system.

The method may end following operation 316.

Thus, using the method shown in FIGS. 3A-3B, a system in accordance with an embodiment may be more likely to provide desired computer implemented services by ensuring that dependencies for new services are in place an in a desired operating condition prior to deployment of the new services that provide the desired computer implemented services.

Figure 4:
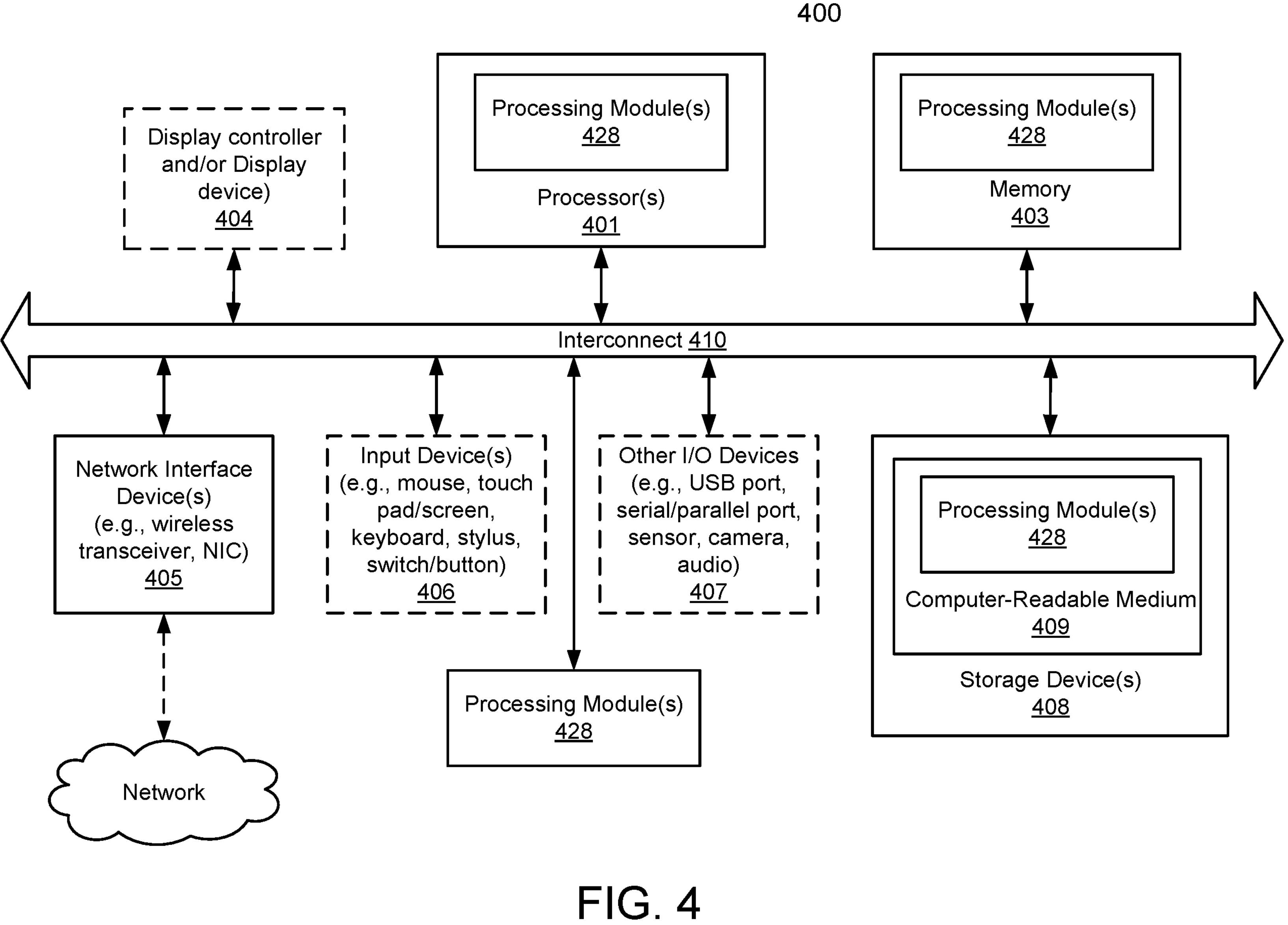
FIG. 4 shows a block diagram illustrating a data processing system in accordance with an embodiment.

Any of the components illustrated in FIGS. 1-2B may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A machine-readable medium includes any mechanism for storing information in a form readable by a machine (e.g., a computer) in a transitory or non-transitory manner. For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing services provided by a data processing system, the method comprising:

obtaining a request for deployment of a service of the services;

obtaining, for the service, a dependency graph, the dependency graph indicating dependencies of the service on other services;

performing, using the dependency graph, a dependency analysis of the data processing system with respect to the other services to identify a compatibility state of the data processing system with respect to the service;

in a first instance of the performing where the compatibility state of the data processing system is compatible with respect to the service:

instantiating a new instance of the service on the data processing system; and providing computer implemented services using, at least in part, the new instance of the service;

in a second instance of the performing where the compatibility state of the data processing system is incompatible with respect to the service:

performing, using at least the dependency graph, an updating process for the data processing system to change the compatibility state to be compatible with respect to the service;

instantiating the new instance of the service on the data processing system; and providing the computer implemented services using, at least in part, the new instance of the service, wherein, in both of the first instance and the second instance of the performing, after the data processing system is compatible with the service and prior to instantiating the new instance of the service on the data processing system, the method comprises:

performing a dependency readiness checking process using an existing services repository of the data processing system to validate a condition of all of the services hosted by the data processing system that are specified in the dependency graph, the dependency readiness checking process comprising initiating use of all of the services hosted by the data processing system that are specified in the dependency graph using one or more test workloads, wherein the new instance of the service is only deployed to and instantiated on the data processing system after the condition of all of the services hosted by the data processing system that are specified in the dependency graph is validated as being in a good operable condition state.

2. The method of claim 1, wherein performing the dependency analysis comprises:

identifying the other services on the dependency graph; and attempting to verify that first instances of the other services are hosted by the data processing system.

3. The method of claim 2, wherein attempting to verify that the first instances of the other services are hosted by the data processing system comprises:

for one instance of the other services that is verified as being hosted by the data processing system:

identifying dependencies of the one instance of the other services to identify at least one additional service; and attempting to verify that second instances of the at least one additional service are hosted by the data processing system.

4. The method of claim 1, wherein performing the updating process comprises:

for a missing service of the other services:

instantiating a new instance of the missing service; and validating operation of the new instance to obtain a validated service.

5. The method of claim 4, wherein performing the updating process further comprises:

for the missing service of the other services:

performing a dependency analysis for the validated service to identify a second missing service; and instantiating a second new instance of the second missing service.

6. The method of claim 1, wherein the dependency graph comprises nodes that represent the other services and edges that represent the dependencies of the other services.

7. The method of claim 6, wherein a dependency of the dependencies represents a relationship between a first service of the other services and a second service of the other services, and the relationship indicates that an instance of the second service must be available for use by the first service for the first service to operate nominally.

8. The method of claim 6, wherein the dependency graph is based on source code corresponding to the service.

9. The method of claim 8, wherein the source code comprises application programming interface calls, and nodes and edges of the dependency graph are based, at least in part, on the application programming interface calls.

10. A non-transitory machine-readable medium having instructions stored therein, which when executed by a processor, cause the processor to perform operations for managing services provided by a data processing system, the operations comprising:

obtaining a request for deployment of a service of the services;

obtaining, for the service, a dependency graph, the dependency graph indicating dependencies of the service on other services;

performing, using the dependency graph, a dependency analysis of the data processing system with respect to the other services to identify a compatibility state of the data processing system with respect to the service;

in a first instance of the performing where the compatibility state of the data processing system is compatible with respect to the service:

instantiating a new instance of the service on the data processing system; and providing computer implemented services using, at least in part, the new instance of the service;

in a second instance of the performing where the compatibility state of the data processing system is incompatible with respect to the service:

performing, using at least the dependency graph, an updating process for the data processing system to change the compatibility state to be compatible with respect to the service;

instantiating the new instance of the service on the data processing system; and providing the computer implemented services using, at least in part, the new instance of the service, wherein, in both of the first instance and the second instance of the performing, after the data processing system is compatible with the service and prior to instantiating the new instance of the service on the data processing system, the operations comprise:

performing a dependency readiness checking process using an existing services repository of the data processing system to validate a condition of all of the services hosted by the data processing system that are specified in the dependency graph, the dependency readiness checking process comprising initiating use of all of the services hosted by the data processing system that are specified in the dependency graph using one or more test workloads, wherein the new instance of the service is only deployed to and instantiated on the data processing system after the condition of all of the services hosted by the data processing system that are specified in the dependency graph is validated as being in a good operable condition state.

11. The non-transitory machine-readable medium of claim 10, wherein performing the dependency analysis comprises:

identifying the other services on the dependency graph; and attempting to verify that first instances of the other services are hosted by the data processing system.

12. The non-transitory machine-readable medium of claim 11, wherein attempting to verify that the first instances of the other services are hosted by the data processing system comprises:

for one instance of the other services that is verified as being hosted by the data processing system:

identifying dependencies of the one instance of the other services to identify at least one additional service; and attempting to verify that second instances of the at least one additional service are hosted by the data processing system.

13. The non-transitory machine-readable medium of claim 10, wherein performing the updating process comprises:

for a missing service of the other services:

instantiating a new instance of the missing service; and validating operation of the new instance to obtain a validated service.

14. The non-transitory machine-readable medium of claim 13, wherein performing the updating process further comprises:

for the missing service of the other services:

performing a dependency analysis for the validated service to identify a second missing service; and instantiating a second new instance of the second missing service.

15. The non-transitory machine-readable medium of claim 10, wherein the dependency graph comprises nodes that represent the other services and edges that represent the dependencies of the other services.

16. A data processing system, comprising:

a processor; and a memory coupled to the processor to store instructions, which when executed by the processor, cause the processor to perform operations for managing services provided by the data processing system, the operations comprising:

obtaining a request for deployment of a service of the services;

obtaining, for the service, a dependency graph, the dependency graph indicating dependencies of the service on other services;

performing, using the dependency graph, a dependency analysis of the data processing system with respect to the other services to identify a compatibility state of the data processing system with respect to the service;

in a first instance of the performing where the compatibility state of the data processing system is compatible with respect to the service:

instantiating a new instance of the service on the data processing system; and providing computer implemented services using, at least in part, the new instance of the service;

in a second instance of the performing where the compatibility state of the data processing system is incompatible with respect to the service:

performing, using at least the dependency graph, an updating process for the data processing system to change the compatibility state to be compatible with respect to the service;

instantiating the new instance of the service on the data processing system; and providing the computer implemented services using, at least in part, the new instance of the service, wherein, in both of the first instance and the second instance of the performing, after the data processing system is compatible with the service and prior to instantiating the new instance of the service on the data processing system, the operations comprise:

performing a dependency readiness checking process using an existing services repository of the data processing system to validate a condition of all of the services hosted by the data processing system that are specified in the dependency graph, the dependency readiness checking process comprising initiating use of all of the services hosted by the data processing system that are specified in the dependency graph using one or more test workloads, wherein the new instance of the service is only deployed to and instantiated on the data processing system after the condition of all of the services hosted by the data processing system that are specified in the dependency graph is validated as being in a good operable condition state.

17. The data processing system of claim 16, wherein performing the dependency analysis comprises:

identifying the other services on the dependency graph; and attempting to verify that first instances of the other services are hosted by the data processing system.

18. The data processing system of claim 17, wherein attempting to verify that the first instances of the other services are hosted by the data processing system comprises:

for one instance of the other services that is verified as being hosted by the data processing system:

identifying dependencies of the one instance of the other services to identify at least one additional service; and attempting to verify that second instances of the at least one additional service are hosted by the data processing system.

19. The data processing system of claim 16, wherein performing the updating process comprises:

for a missing service of the other services:

instantiating a new instance of the missing service; and validating operation of the new instance to obtain a validated service.

20. The data processing system of claim 19, wherein performing the updating process further comprises:

for the missing service of the other services:

performing a dependency analysis for the validated service to identify a second missing service; and instantiating a second new instance of the second missing service.

* * * * *